UNITED STATES PATENT OFFICE.

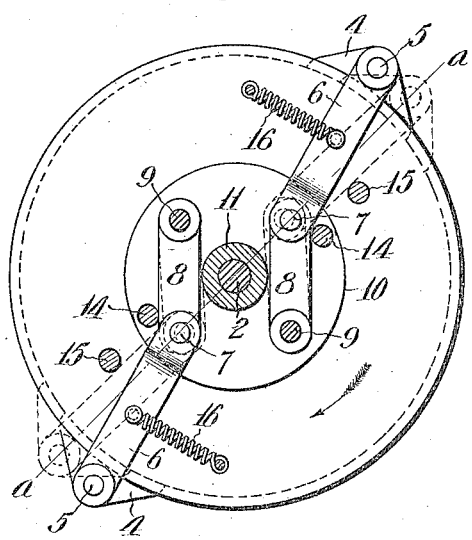
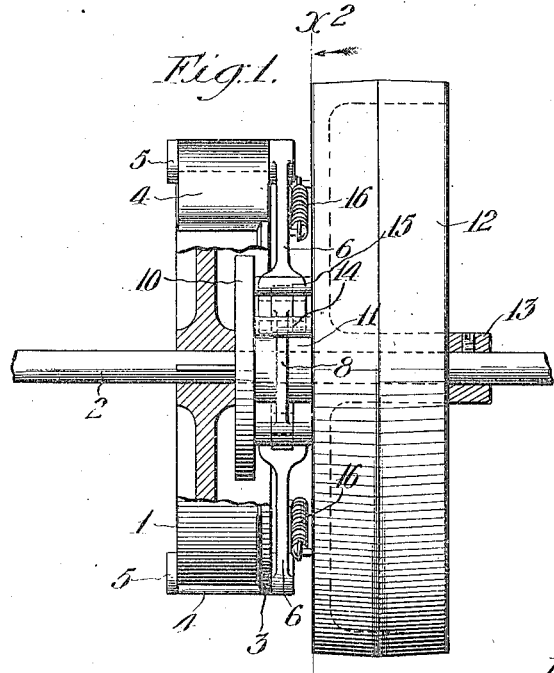

HANS P. MOLANDER, OF OCEAN PARK, CALIFORNIA.

CLUTCH.

1,161,325.  Specification of Letters Patent.  Patented Nov. 23, 1915.

Application filed August 4, 1914, Serial No. 855,067. Renewed October 11, 1915. Serial No. 55,342.

*To all whom it may concern:*

Be it known that I, HANS P. MOLANDER, a subject of the King of Sweden, residing at Ocean Park, in the county of Los Angeles, State of California, have invented a new and useful Clutch, of which the following is a specification.

The invention relates to power transmission systems and particularly to clutches.

The principal object of the invention is to provide a clutch which will transmit a rotary movement about a shaft in one direction of rotation and which will be readily released upon a reversal of this motion.

A further object of the invention is to provide such a clutch in which the power used to reverse is very small and in which the area of the power transmitting parts subjected to friction will be very large.

Other objects and advantages will be evident hereinafter.

Referring to the drawings which are for illustrative purposes only: Figure 1 is a side elevation of the invention, some of the parts being broken away and shown in section to better illustrate the internal construction. Fig. 2 is a section on the plane $x^2-x^2$ of Fig. 1, looking in the direction of the arrows.

In the embodiment of the invention shown in the drawings, a clutch wheel 1 is mounted rigidly on a shaft 2 which is connected to any sort of machinery, not shown. The clutch wheel 1 is provided with a flange 3 and two clutch shoes 4 bear on the periphery thereof. The shoes 4 are pivoted on pins 5 rigidly secured in outer arms 6 which are in turn pivoted on pins 7 carried on inner arms 8. The arms 8 are pivoted on pins 9 which are secured on a disk 10 connected by a hub 11 to a driving pulley 12 which turns loosely on the shaft 2 being kept in alinement by a collar 13. Restraining pins 14 are also secured in the disk 10 and the pulley 12, and stop pins 15 are secured in the pulley 12. Tension springs 16 are secured between the outer arms 6 and the pulley 12.

The method of operation of this particular embodiment of my invention is as follows: When the pulley 12 is driven by a belt or any other convenient means, not shown, in the direction of the arrow shown in Fig. 2 the pins 9 are rotated in a clockwise direction and the arms 6 and 8 are thrown into the position shown in full lines in Fig. 2, the shoes 4 being held against the clutch wheel 1 by the springs 16. When the arms 8 strike the restraining pins 14 a further straightening of the arms 6 and 8 is prevented and the shoes 4 are pressed firmly down against the wheel 1 rotating it in the direction of the arrow. So long as the pulley 12 is rotated in this direction the wheel 4 is carried around thereby, and the wheel and pulley turn together. When, however, the direction of rotation of the pulley 12 is reversed the arms 6 and 8 take the position shown in dotted lines in Fig. 2 and the shoes 4 are lifted from the wheel 1, turning freely with relation thereto, the pins 5 being restrained by the pins 15 from passing the diameter *a—a* passing through the center of the shaft and the pins 7.

I claim as my invention:

1. A clutch comprising a shaft, a clutch wheel on said shaft, a driving pulley on said shaft, clutch shoes bearing on the periphery of said wheel, a disk formed integral with said pulley, pivot pins carried between said disk and said pulley, inner arms on said pivot pins, outer arms pivoted to said inner arms, means for connecting the arms and the shoes, and means for restraining the movement of said outer and inner arms to increase the pressure of said shoes on said wheel only when the pulley is turned in one direction.

2. A clutch comprising a shaft, a clutch wheel on said shaft, a driving pulley on said shaft, clutch shoes bearing on the periphery of said wheel, a disk formed integral with said pulley, pivot pins carried between said disk and said pulley, inner arms on said pivot pins, outer arms pivoted to said inner arms, means for connecting the arms and the shoes, restraining pins fixed in said disk and pulley to prevent the said arms from assuming a straight line as the pulley is turned in one direction.

3. A clutch comprising a shaft, a clutch wheel on said shaft, a driving pulley on said shaft, clutch shoes bearing on the periphery of said wheel, a disk formed integral with said pulley, pivot pins carried between said disk and said pulley, inner arms on said pivot pins, outer arms pivoted to said inner arms, means for connecting the arms and the shoes, and means for restraining the movement of said outer and inner arms to increase the pressure of said shoes on said wheel only when the pulley is turned in one direction and whereby a quick release of said shoes is accomplished when the pulley turns in the opposite direction.

4. A clutch comprising a shaft, a clutch wheel on said shaft, a driving pulley on said shaft, clutch shoes bearing on the periphery of said wheel, a disk formed integral with said pulley, pivoted pins carried between said disk and said pulley, inner arms on said pivot pins, outer arms pivoted to said inner arms, means for connecting the arms and the shoes, springs tending to increase the pressure of said shoes on said wheel, and means for restraining the movement of said outer and inner arms to increase the pressure of said shoes on said wheel only when the pulley is turned in one direction.

5. A clutch comprising a shaft, a clutch wheel on said shaft, a driving pulley on said shaft, clutch shoes bearing on the periphery of said wheel, a disk formed integral with said pulley, pivot pins carried between said disk and said pulley, inner arms on said pivot pins, outer arms pivoted to said inner arms, means for connecting the arms and the shoes, springs tending to increase the pressure of said shoes on said wheel, restraining pins fixed in said disk and pulley to prevent the said arms from assuming a straight line as the pulley is turned in one direction.

6. A clutch comprising a shaft, a clutch wheel on said shaft, a driving pulley on said shaft, clutch shoes bearing on the periphery of said wheel, a disk formed integral with said pulley, pivot pins carried between said disk and said pulley, inner arms on said pivot pins, outer arms pivoted to said inner arms, means for connecting the arms and the shoes, springs tending to increase the pressure of said shoes on said wheel, and means for restraining the movement of said outer and inner arms to increase the pressure of said shoes on said wheel only when the pulley is turned in one direction and whereby a quick release of said shoes is accomplished when the pulley turns in the opposite direction.

In testimony whereof, I have hereunto set my hand at Los Angeles, California, this 29th day of July, 1914.

HANS P. MOLANDER.

In presence of—
FRED A. MANSFIELD,
FORD W. HARRIS.

Copies of this patent may be obtained for five cents each, by addressing the "Commissioner of Patents. Washington, D. C."